(12) United States Patent
Togita

(10) Patent No.: US 7,672,374 B2
(45) Date of Patent: Mar. 2, 2010

(54) IMAGE PROCESSING APPARATUS

(75) Inventor: Kouji Togita, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1422 days.

(21) Appl. No.: 11/054,830

(22) Filed: Feb. 10, 2005

(65) Prior Publication Data

US 2005/0180510 A1     Aug. 18, 2005

(30) Foreign Application Priority Data

Feb. 17, 2004    (JP)    ............................. 2004-039985

(51) Int. Cl.
  *H04N 7/12*    (2006.01)
  *H04N 7/26*    (2006.01)
(52) U.S. Cl. .................. 375/240.13; 386/109
(58) Field of Classification Search ............ 375/240.13; 386/109, 68, 112
See application file for complete search history.

(56) References Cited

U.S. PATENT DOCUMENTS 4,680,647 A * 7/1987 Moriyama ................. 386/112
5,907,660 A * 5/1999 Inoue et al. ................. 386/109
5,999,693 A * 12/1999 Juri et al. ....................... 386/68

FOREIGN PATENT DOCUMENTS

JP        11-220694 A     8/1999

* cited by examiner

*Primary Examiner*—Gims S Philippe
(74) *Attorney, Agent, or Firm*—Canon U.S.A. Inc., IP Division

(57) ABSTRACT

An image processing apparatus includes an inputting unit for inputting moving image data that is composed of frames each including first and second fields and that is encoded by intra-frame and inter-frame encoding; an instructing unit for submitting a request for outputting a still image; a still image generating unit for generating still image data including first encoded data and second encoded data, each of these encoded data having a prediction error of zero with respect to a reference image; a multiplexing unit for selecting to output either the still image data generated by the still image generating unit or the moving image data input by the inputting unit; a controlling unit for controlling the multiplexing unit so as to select the still image data generated by the still image generating unit; and a transmitting unit for transmitting the image data output from the multiplexing unit in an encoded state.

13 Claims, 4 Drawing Sheets

IMAGE PROCESSING APPARATUS

BACKGROUND OF THE INVENTION

1. Field of the Invention

The present invention relates to image processing apparatuses, and in particular, to processing of encoded image data.

2. Description of the Related Art

Apparatuses having the following functions are disclosed: encoding moving image data in an encoding format, such as, the Moving Picture Experts Group (MPEG) format, recording encoded image data on recording media, such as optical disks, and playing it back.

In some cases, image data encoded in this way is read from recording media and transmitted through digital transmission lines, such as the Institute of Electrical and Electronic Engineers 1394 (IEEE1394) interface.

For transmitting image data read in this way, a technique is disclosed (for example, in Japanese Patent Laid-Open No. 11-220694), in which when a request for playing back a still image is submitted, still image data generated with skipped macroblocks having no prediction error with respect to a reference image is inserted into moving image data and transmitted.

In the related art described above, still image data having no difference with respect to a reference frame is inserted and transmitted. In general television systems, such as the National Television System Committee (NTSC) system, an image of one frame is interlaced with images of two fields. When a reference image frame inserted as a still image has an object of shooting that sharply moves during the interval between two fields, a decoded image is disadvantageously blurred.

SUMMARY OF THE INVENTION

The present invention provides solutions to the problems described above.

Furthermore, the present invention provides a high-quality still image after decoding by eliminating blurring of a still image inserted into encoded moving image data.

An embodiment of the present invention provides an image processing apparatus including an inputting unit for inputting moving image data that is composed of a plurality of frames each including a first field and a second field and that is encoded by intra-frame encoding and inter-frame encoding; an instructing unit for submitting a request for outputting a still image; a still image generating unit for generating still image data including first encoded data and second encoded data, the first encoded data having a prediction error of zero with respect to a reference image, the reference image being image data of the first field of one of the frames of the moving image data, the frame corresponding to the request from the instructing unit, the second encoded data having a prediction error of zero with respect to a reference image, the reference image being averaged image data of two consecutive lines in the first field; a multiplexing unit for selecting to output either the still image data generated by the still image generating unit or the moving image data input by the inputting unit; a controlling unit for controlling the multiplexing unit so as to select the still image data generated by the still image generating unit in response to the request from the instructing unit; and a transmitting unit for transmitting the image data output from the multiplexing unit in an encoded state.

Further features and advantages of the present invention will become apparent from the following description of exemplary embodiments with reference to the attached drawings.

DESCRIPTION OF THE EMBODIMENTS

Figure 1:
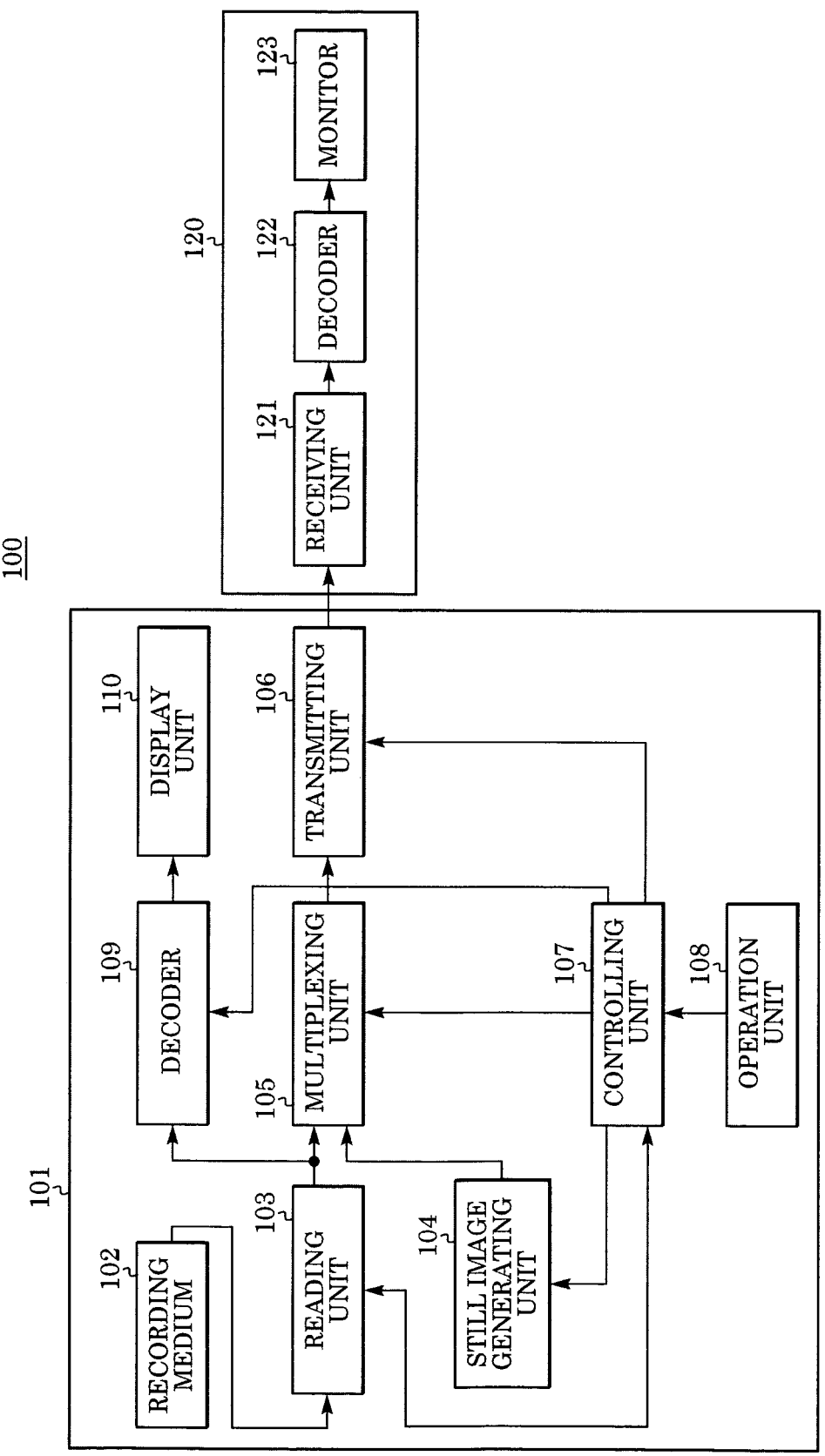
FIG. 1 is a block diagram illustrating the configuration of an image processing system according to the present invention.

FIG. 1 is a block diagram illustrating the configuration of an image transmitting system 100 including a playback apparatus 101 according to the present invention. The system 100 shown in FIG. 1 includes a playback apparatus 101 and a receiving apparatus 120.

The playback apparatus 101 includes a recording medium 102, such as an optical disk; a reading unit 103 reading moving image data that is encoded in the MPEG format and recorded on the recording medium 102; a still image generating unit 104; a multiplexing unit 105 selecting the MPEG data from the reading unit 103 or still image data from the still image generating unit 104 for outputting; a transmitting unit 106 transmitting the encoded data output from the multiplexing unit 105, for example, in the IEEE1394 format; a controlling unit 107; an operation unit 108 submitting requests for starting and stopping playback, playing back a still image, playing back slowly, and the like; a decoder 109 decoding the MPEG data output from the reading unit 103; and a display unit 110 displaying the image decoded by the decoder 109. The still image generating unit 104 generates the still image data, as described later, in response to a request from the controlling unit 107. The controlling unit 107 controls the units in the apparatus in response to a request from the operation unit 108.

The receiving apparatus 120 includes a receiving unit 121 receiving the encoded data transmitted from the transmitting unit 106, a decoder 122 decoding the MPEG data received by the receiving unit 121 and a monitor 123 displaying the image decoded by the decoder 122.

In this configuration, when a request for starting playback is submitted from the operation unit 108, the controlling unit 107 controls the reading unit 103 so as to read the MPEG-encoded data from the recording medium 102 to output to the decoder 109 and the multiplexing unit 105. The decoder 109 decodes the read-out MPEG data to display on the display unit 110.

In normal playback, the controlling unit 107 controls the multiplexing unit 105 so as to output the MPEG data output from the reading unit 103 as it is. The transmitting unit 106 outputs the MPEG data output from the multiplexing unit 105 to the receiving apparatus 120 through a transmission line.

The receiving apparatus 120 receives the MPEG data transmitted in this way, and the decoder 122 decodes it to display an image on the monitor 123.

A process for playing back a still image when a request is submitted in normal playback is described next.

Figure 2:
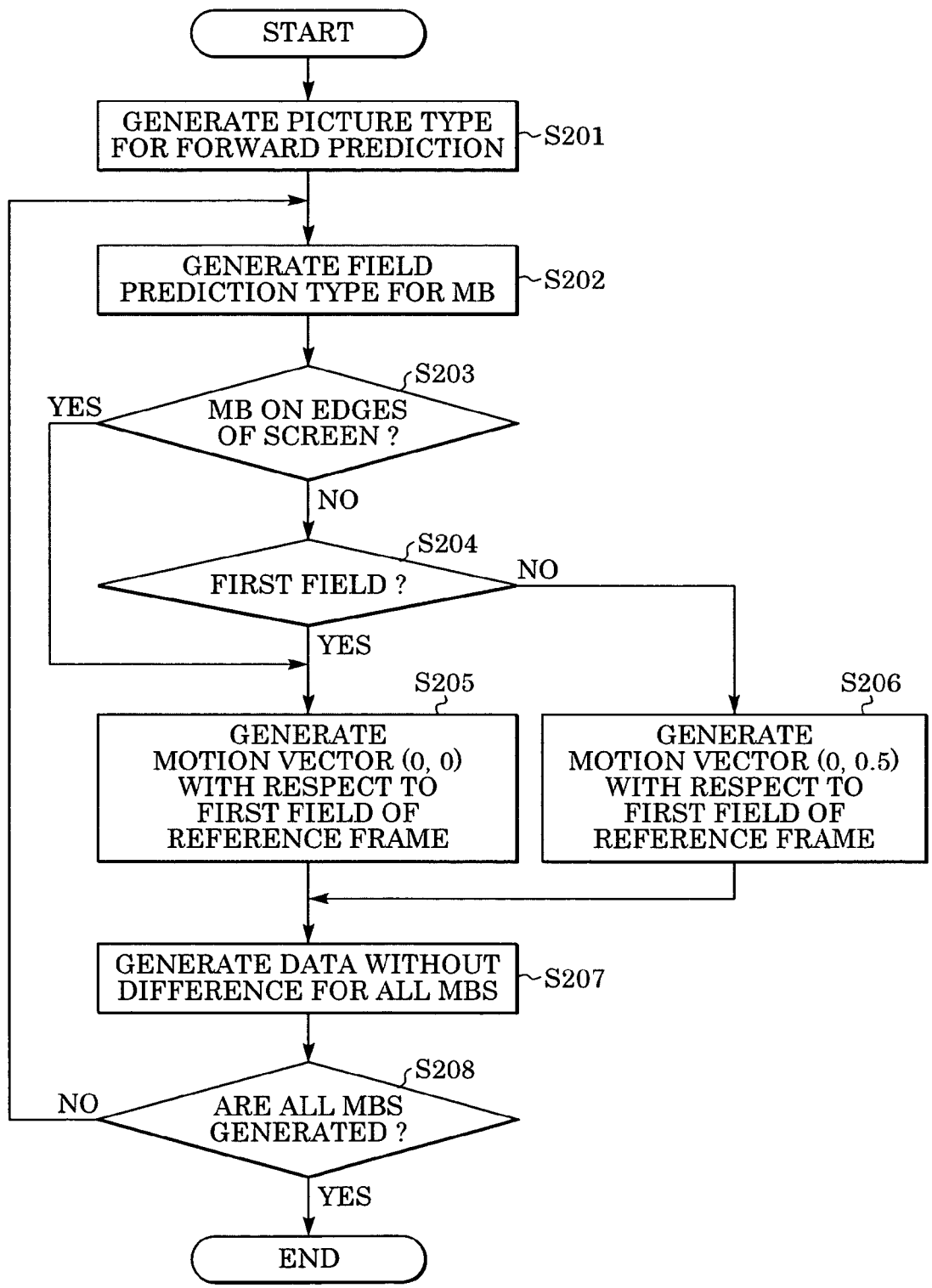
FIG. 2 is a flow chart illustrating a process of generating still image data.

FIG. 2 is a flow chart illustrating a process in the still image generating unit 104 in response to a request for playing back a still image.

In step S201, the picture type of still image data to be inserted is set for forward prediction when a request for generating still image data is submitted from the controlling unit 107. As is generally known, encoding is carried out in the MPEG-2 format, switching to one of the following three picture types every frame: I-pictures in which intra-frame encoding is carried out, P-pictures in which prediction errors with respect to preceding frames are encoded, and B-pictures in which prediction errors with respect to preceding and upcoming frames are encoded.

In step S201, the picture type is set for forward prediction (P-pictures) out of these three picture types.

In step S202, the prediction type of each macroblock (MB) of the still image data to be generated is set to the field prediction type.

When motion-compensated prediction encoding is carried out in the MPEG-2 format, the following types of prediction are available: frame prediction in which prediction encoding between frames is carried out for each frame, and field prediction in which motion-compensated prediction is carried out using image data of each field of a reference frame for each of a first field and a second field of one frame. In the embodiments described herein, the prediction type of still image data is set for field prediction.

In step S203, whether data of a MB to be generated is that on edges of a screen is determined. When the data of the MB is that on edges of a screen, processing proceeds to step S205. On the other hand, when the data of the MB is not that on edges of a screen, whether the data of the MB is that of a first field is determined in step S204.

When the data of the MB is that of a first field or when the data of the MB is that on edges of a screen, a motion vector (0, 0) of this MB is generated from a first field of a reference frame, that is, a frame output from the reading unit 103 when the request for playing back the still image is submitted, in step S205. When the data of the MB is that of a second field, a motion vector (0, 0.5) of this MB is generated from the first field of the reference frame in step S206.

In step S207, data of all the MBs that has no prediction error (difference) with respect to the reference image is generated.

When the MB is on edges of a screen in step S203, the motion vector (0, 0.5) cannot be selected. Thus, the motion vector (0, 0) of each of the first field and the second field for the MB on edges of a screen is generated from the first field of the reference frame (step S205).

The same process is repeated until it is determined that data for all the MBs of the still image data of one frame is generated in step S208.

A process of inserting the still image data generated in this way is described next.

Figure 3:
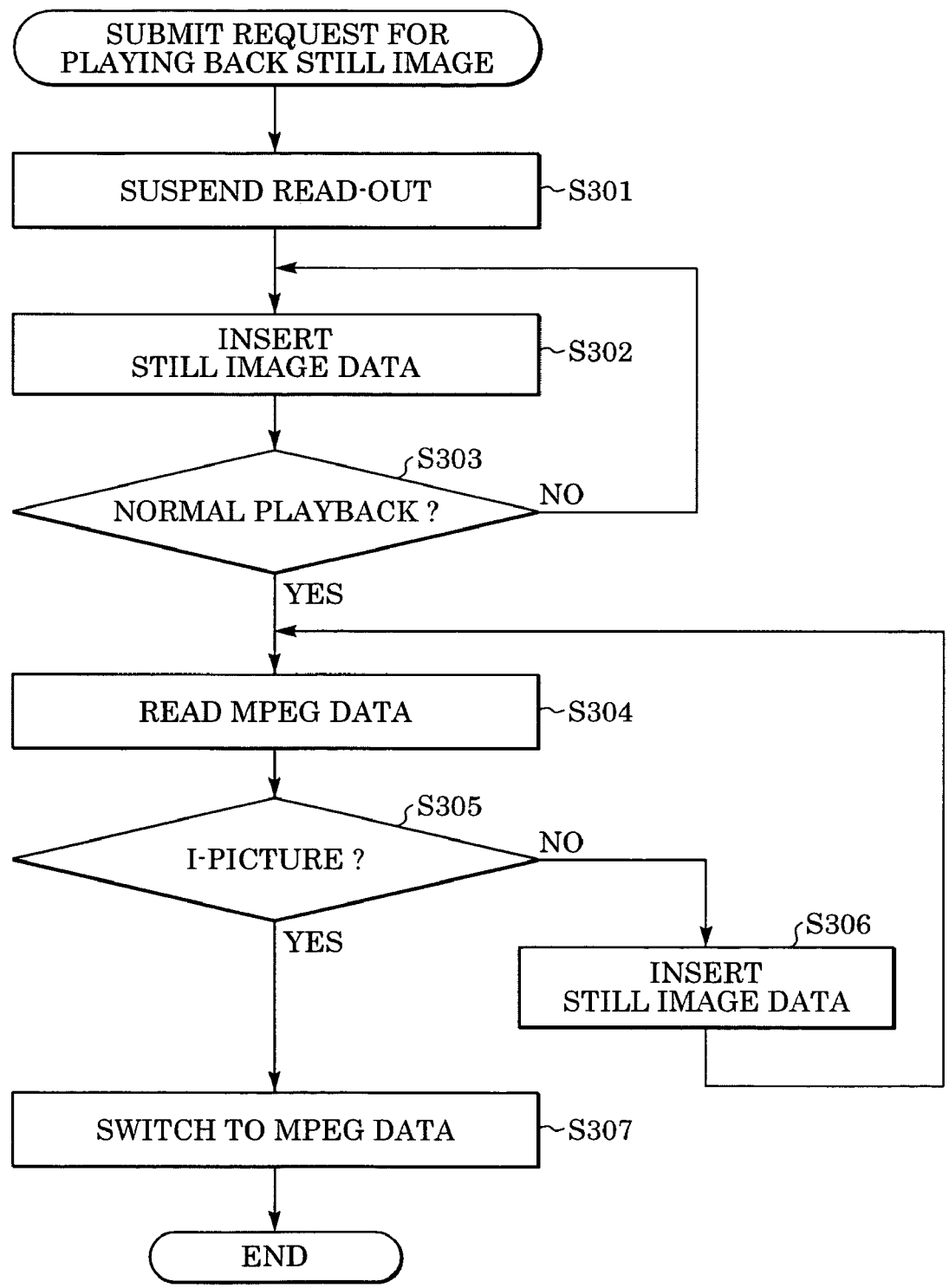
FIG. 3 is a flow chart illustrating a process of inserting still image data.

FIG. 3 is a flow chart illustrating a process of inserting still image data by the controlling unit 107 in response to a request for playing back a still image.

In step S301 in FIG. 3, the controlling unit 107 controls the reading unit 103 so as to suspend read-out of MPEG data from the recording medium 102 in response to a request for playing back a still image. When the reading unit 103 suspends read-out of data of the frame, the reading unit 103 stores the address of the data of the frame on the recording medium.

In step S302, the multiplexing unit 105 is controlled so as to start to insert the still image data generated by the still image generating unit 104 as described above when a frame is to be output next to the frame currently being output from the reading unit 103 in response to the submission of the request for playing back the still image.

Still image data is inserted (step S302) until it is determined (in step S303) that a request for normal playback is submitted from the operation unit 108. When it is determined in step S303 that a request for normal playback is submitted, processing proceeds to step S304 and the reading unit 103 is controlled so as to resume reading the MPEG data from the address when read-out of the MPEG data is suspended in S301. Then, in step S305, whether the read-out frame data is that of an I-picture is determined.

In the MPEG-2 system, encoding is carried out using three picture types I, P, and B, as described above. The picture that can be decoded within one frame is only the I-picture. Moreover, each group of pictures (GOP) is a unit for encoding, each GOP including a predetermined number of P-pictures and B-pictures that are periodically inserted between two I-pictures. Thus, a still image is continuously inserted in step S306 until it is determined in step S305 that an I-picture leading a GOP is read from the recording medium 102.

When it is determined in step S305 that an I-picture is read, the multiplexing unit 105 is controlled so as to output the MPEG data from the reading unit 103 in turn in step S307.

The still image data inserted in this way is described next with reference to FIG. 4.

Figure 4:
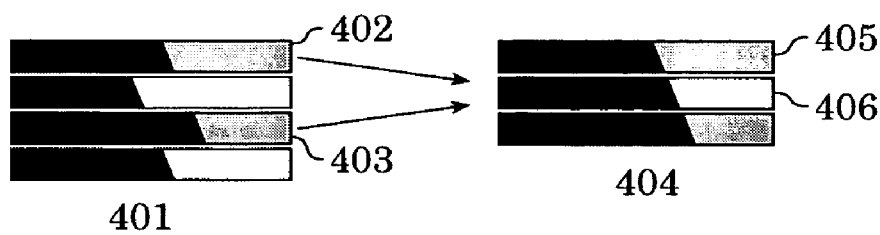
FIG. 4 illustrates still image data after decoding.

FIG. 4 illustrates a part of a macroblock 401 of a reference image referred to by the inserted still image data. The n-th line 402 and the (n+1)-th line 403 are indicated in a first field of the macroblock 401 of the reference image. FIG. 4 also illustrates a part of a macroblock 404 of data decoded from the inserted still image data. The n-th line 405 in a first field and the n-th line 406 in a second field of the data decoded from the still image data are indicated.

When the still image data generated as described above is decoded, the first field of the MB of the still image data has a motion vector (0, 0) and no difference. Thus, the data of the first field of the reference frame image is output as the data of the first field of the decoded still image data. That is, the data of the n-th line 402 in the first field of the reference image is the same as that of the n-th line 405 in the first field of the decoded still image data.

On the other hand, the second field of the MB of the still image data has a motion vector (0, 0.5) originated from the first field of the reference image. When 0.5 is set as the motion vector, the average of two consecutive lines in the first field of the reference frame is the reference image data of this MB. Since the difference is 0, the n-th line 406 in the second field of the decoded still image data is generated as the average of the n-th line 402 and the (n+1)-th line 403 in the first field of the reference image.

Figure 5:
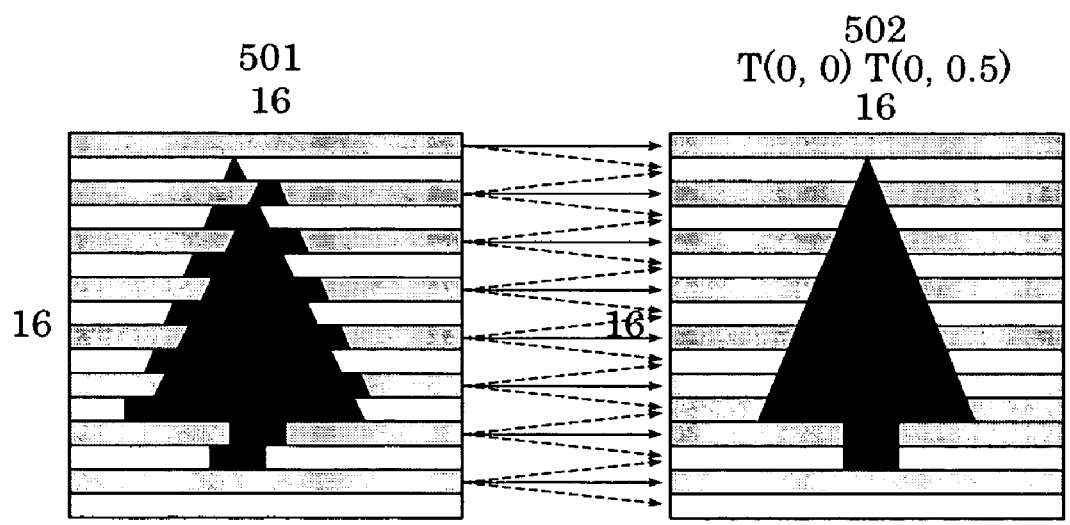
FIG. 5 illustrates still image data after decoding.

Accordingly, for example, when still image data predicted from MB data 501 having an object of shooting that sharply moves during the interval between fields as shown in FIG. 5 is inserted and decoded, a still image 502 free from blurring caused by the motion can be achieved.

A process of slow playback is described next.

In a slow playback mode, the reference image is changed every predetermined number of frames in accordance with a playback speed, and still image data is simultaneously inserted as described above.

In the MPEG system, P-pictures are encoded with reference to I-pictures, and B-pictures are encoded with reference to foregoing and succeeding I-pictures or P-pictures. Thus, the sequence of pictures of MPEG data read from the recording medium 102 is as follows, for example: I1, P1, B1, B2, P2, B3, B4, and so on.

When this MPEG data is decoded and displayed, the sequence of these pictures is as follows: I1, B1, B2, P1, B3, B4, and so on.

Thus, for example, when slow playback at half speed starts upon playing back an image of I1, the sequence of the process is as follows: One frame of still image predicted from I1 is inserted, each data of P1 and B1 is read and transmitted, one frame of still image data is generated with reference to B1 and inserted as described above, and data of B2 picture is transmitted. Subsequently, a still image predicted from a B-picture is inserted and transmitted after an I-picture or a P-picture required for decoding the B-picture is transmitted.

In this way, an image free from blurring can be achieved in a slow playback mode, as a result of each inserted still image being decoded.

According to the embodiments, a high-quality still image can be achieved by preventing blurring of a decoded image even when an inserted still image has an object of shooting that sharply moves.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-039985 filed Feb. 17, 2004, which is hereby incorporated by reference herein.

What is claimed is:

1. An image processing apparatus comprising:
   inputting means for inputting moving image data that is composed of a plurality of frames each including a first field and a second field and that is encoded by intra-frame encoding and inter-frame encoding;
   instructing means for submitting a request for outputting a still image;
   still image generating means for generating still image data including first encoded data having a prediction error of zero with respect to a reference image that is the first field of a frame corresponding to the request from the instructing means in the moving image data, and second encoded data having a prediction error of zero with respect to a reference image that is averaged image data of two consecutive lines in the first field;
   multiplexing means for selecting to output either the still image data generated by the still image generating means or the moving image data input by the inputting means;
   controlling means for controlling the multiplexing means so as to select the still image data generated by the still image generating means in response to the request from the instructing means to output the still image; and
   transmitting means for transmitting the image data output from the multiplexing means in an encoded state,
   wherein the controlling means controls the multiplexing means so as to select image data of a frame encoded by the intra-frame encoding input next to the image data of the frame of the moving image data, the frame corresponding to the request from the instructing means, in response to a request for starting to output a normal playback image from the instructing means after the request for outputting the still image.

2. An image processing apparatus according to claim 1, wherein the inputting means comprises playback means for playing back the moving image data from a recording medium, and the controlling means controls the playback means so as to suspend playback of the moving image data in response to a request from the instructing means for suspending playback and to resume playback of the moving image data in response to the request from the instructing means for starting to output a normal playback image.

3. An image processing apparatus according to claim 1, wherein the still image generating means generates the still image data as a predictive-coded frame.

4. An image processing apparatus comprising:
   inputting means for inputting moving image data that is composed of a plurality of frames each including a first field and a second field and that is encoded by intra-frame encoding and inter-frame encoding;
   instructing means for submitting a request for outputting a still image;
   still image generating means for generating still image data including first encoded data encoded so as to obtain the same image as a reference image that is the first field of a frame corresponding to the request from the instructing means in the moving image data when the first encoded image data is decoded, and second encoded data encoded so as to obtain the same image as a reference image that is averaged image data of two consecutive lines in the first field of the frame corresponding to the request from the instructing means in the moving image data when the second encoded image data is decoded;
   multiplexing means for selecting to output either the still image data generated by the still image generating means or the moving image data input by the inputting means;
   controlling means for controlling the multiplexing means so as to select the still image data generated by the still image generating means in response to the request from the instructing means, wherein the controlling means controls the multiplexing means so as to select image data of a frame encoded by intra-frame encoding input next to the image data of the frame of the moving image data, the frame corresponding to the request from the instructing means, in response to a request for starting to output a normal playback image from the instructing means after the request for outputting the still image; and
   transmitting means for transmitting the image data output from the multiplexing means in an encoded state.

5. An image processing apparatus according to claim 4, wherein the inputting means comprises playback means for playing back the moving image data from a recording medium, and the controlling means controls the playback means so as to suspend playback of the moving image data in response to a request from the instructing means and to resume playback of the moving image data in response to the request from the instructing means for starting to output a normal playback image.

6. An image processing apparatus according to claim 4, wherein the still image generating means generates the still image data as image data encoded by inter-frame encoding.

7. An image processing apparatus comprising:
   inputting means for inputting moving image data that is composed of a plurality of frames each including a first field and a second field and that is encoded by intra-frame encoding and motion-compensated prediction encoding;
   instructing means for submitting a request for outputting a still image;

still image generating means for generating, in response to the request from the instructing means, still image data including first encoded data having a prediction error of zero and a motion vector (0, 0) with respect to a reference image that is the first field of a frame corresponding to the request from the instructing means, and second encoded data having a prediction error of zero and a motion vector (0, 0.5) with respect to the reference image;

multiplexing means for selecting to output either the still image data generated by the still image generating means or the moving image data input by the inputting means;

controlling means for controlling the multiplexing means so as to select the still image data generated by the still image generating means in response to the request from the instructing means; and transmitting means for transmitting the image data output from the multiplexing means in an encoded state.

8. An image processing apparatus according to claim 7, wherein the still image generating means generates the motion vector for each of the blocks composed of a predetermined number of pixels and generates a motion vector (0, 0) for each of those blocks on edges of a screen in the second encoded data.

9. An image processing apparatus according to claim 7, wherein the controlling means controls the multiplexing means so as to select image data that is input next to the image data of the frame of the moving image data, the frame corresponding to the request from the instructing means, in response to a request for starting to output a normal playback image from the instructing means after the request for outputting the still image.

10. An image processing apparatus according to claim 9, wherein the inputting means comprises playback means for playing back the moving image data from a recording medium, and the controlling means controls the playback means so as to suspend playback of the moving image data in response to a request from the instructing means and to resume the playback of the moving image data in response to the request from the instructing means for starting to output a normal playback image.

11. An image processing apparatus according to claim 7, wherein the still image generating means generates the still image data as image data encoded by inter-frame encoding.

12. An image processing apparatus comprising:
inputting means for inputting moving image data that is composed of a plurality of frames each including a first field and a second field and that is encoded by intra-frame encoding and inter-frame encoding;
instructing means for submitting a request for outputting a still image;
still image generating means for generating still image data including first encoded data having a prediction error of zero with respect to a reference image that is the first field of a frame corresponding to the request from the instructing means in the moving image data, and second encoded data having a prediction error of zero with respect to a reference image that is averaged image data of two consecutive lines in the first field;
multiplexing means for selecting to output either the still image data generated by the still image generating means or the moving image data input by the inputting means;
controlling means for controlling the multiplexing means so as to select the still image data generated by the still image generating means in response to the request from the instructing means to output the still image; and
transmitting means for transmitting the image data output from the multiplexing means in an encoded state,
wherein the inputting means comprises playback means for playing back the moving image data from a recording medium, and the controlling means controls the playback means so as to suspend playback of the moving image data in response to a request from the instructing means for suspending playback and to resume playback of the moving image data in response to the request from the instructing means for starting to output a normal playback image.

13. An image processing apparatus comprising:
inputting means for inputting moving image data that is composed of a plurality of frames each including a first field and a second field and that is encoded by intra-frame encoding and inter-frame encoding;
instructing means for submitting a request for outputting a still image;
still image generating means for generating still image data including first encoded data encoded so as to obtain the same image as a reference image that is the first field of a frame corresponding to the request from the instructing means in the moving image data when the first encoded image data is decoded, and second encoded data encoded so as to obtain the same image as a reference image that is averaged image data of two consecutive lines in the first field of the frame corresponding to the request from the instructing means in the moving image data when the second encoded image data is decoded;
multiplexing means for selecting to output either the still image data generated by the still image generating means or the moving image data input by the inputting means;
controlling means for controlling the multiplexing means so as to select the still image data generated by the still image generating means in response to the request from the instructing means; and
transmitting means for transmitting the image data output from the multiplexing means in an encoded state,
wherein the inputting means comprises playback means for playing back the moving image data from a recording medium, and the controlling means controls the playback means so as to suspend playback of the moving image data in response to a request from the instructing means and to resume playback of the moving image data in response to the request from the instructing means for starting to output a normal playback image.

* * * * *